United States Patent [19]

Dahl et al.

[11] 4,436,497

[45] Mar. 13, 1984

[54] MOLD AND VENT PLUG THEREFOR

[75] Inventors: James M. Dahl, Stow; Bernard B. Jacobs; Joseph E. Lipovac, both of Akron; Ralph A. Meglen, Copley; Donald W. Ward, Cuyahoga Falls, all of Ohio

[73] Assignee: The Goodyear Tire & Rubber Company, Akron, Ohio

[21] Appl. No.: 437,094

[22] Filed: Oct. 27, 1982

[51] Int. Cl.$^3$ ............................................. B29H 5/02
[52] U.S. Cl. ................................. 425/28 R; 425/812; 249/141
[58] Field of Search .................... 425/28 R, 28 D, 812, 425/35; 249/141

[56]  References Cited

U.S. PATENT DOCUMENTS

| | | | |
|---|---|---|---|
| 1,746,107 | 2/1930 | De Mattia | 425/28 R |
| 3,377,662 | 4/1968 | Fukushima | 425/812 |
| 3,804,566 | 4/1974 | Kimura et al. | 425/812 |
| 3,822,857 | 7/1974 | Tanie | 425/812 |
| 3,854,852 | 12/1974 | Carter | 425/812 |
| 3,891,363 | 6/1975 | Sievers et al. | 249/141 X |
| 3,989,430 | 11/1976 | Dailey | 425/812 |
| 4,021,168 | 5/1977 | Dailey | 425/812 |

FOREIGN PATENT DOCUMENTS

| | | | |
|---|---|---|---|
| 776569 | 1/1968 | Canada . | |
| 922788 | 4/1963 | United Kingdom | 425/812 |

Primary Examiner—J. Howard Flint, Jr.
Attorney, Agent, or Firm—L. R. Drayer

[57]  ABSTRACT

A mold for forming elastomeric articles and the like, has vent plugs inserted in bores through the body of the mold. The vent plugs may be manufactured of sintered metal. Each vent plug has a bore therethrough that is significantly smaller than the bore through the mold body, so that very little, if any, of the elastomeric substance being formed in the mold flows into the bore of the vent plug.

16 Claims, 5 Drawing Figures

MOLD AND VENT PLUG THEREFOR

BACKGROUND OF THE INVENTION

This invention relates to molds for forming elastomeric articles and the like, and more specifically to a vent plug for such molds.

It is desirable to prevent air from being trapped between an elastomeric article and the molding surface of a mold, such that the surface of the article may contact the molding surface uninterruptedly. If air should become trapped between the surface of the article and the molding surface, a blemish, sometimes referred to as a light spot, may result in the finished article. Examples of elastomeric articles that are formed in molds are tires and other products made of rubber or plastic.

It is a widely recognized practice to provide small bores through a mold to act as a means for venting air from between an article and the molding surface of the mold. This practice is fairly successful for eliminating trapped air, but has the disadvantage that the elastomer tends to flow into the bores resulting in undesirable projections on the outer surface of the molded article. While these undesirable projections may generally be removed from the article by an additional trimming operation, the projections are even more troublesome when they break away from the article and remain in the small bores of the mold. Naturally, if the bores become plugged, they will no longer function as vents.

If the bores through a mold body could be made small enough, very little, if any, of the elastomer being formed in the mold will flow into the bores, and any resulting projections from the surface of the molded article will be so small that they will not be easily noticed. However, because the bores are formed by drilling through the wall of a mold having a relatively large thickness, it is impractical to use a drill having a diameter of less than one to two millimeters (mm.), which still is too large to prevent undesirable projections. The present invention provides a mold with vent plugs press-fit into the bores through the mold, and the vent plugs have very small openings through them. Prior art vent plugs have diameters that interfere with the walls of the bores through a mold along substantially their entire length, so that they are difficult to remove and replace. A vent plug manufactured in accordance with this invention has an interference fit along no more than 50 percent of its overall length, so that removal and replacement is greatly facilitated when necessary. Furthermore, the plugging of the opening through a vent plug by a broken-off projection of elastomer is curtailed by slightly enlarging the opening in the vent plug, at the molding surface end, so that the base of the projection of elastomer is stronger and less likely to break when the article is removed from the mold.

These and other advantages are provided by a vent plug for a mold used in forming elastomeric articles and the like, wherein the vent plug manufactured comprises an elongated body having an axis and first and second axial ends. The overall length of the body, measured parallel to the axis, is greater than any external diameter of the body measured perpendicular to the axis. The body has at its first axial end a first external diameter which is constant over a predetermined portion of the length of the body, equal to not more than 50 percent of the overall length. The body has an external diameter along the remainder of its length that is less than said first external diameter, and an opening extends through the body from said first axial end to said second axial end.

There is provided in accordance with another aspect of the invention a mold for forming elastomeric articles and the like comprising an inner molding surface and an outer surface. The inner molding surface defines a cavity in which an article may be formed, and communicates with the outer surface by means of a bore. The bore has a vent plug therein. The vent plug comprises an elongated body having an axis and first and second axial ends. The overall length of said body, measured parallel to said axis, being greater than any external diameter of said body, measured perpendicular to said axis. The body has at its first axial end a first external diameter which is constant over a predetermined portion of the length of the body equal to not more than 50 percent of said overall length. The first external diameter is sufficiently greater than the bore so that the vent plug is press-fit into the bore. The body along the remainder of its length has an external diameter that is less than said first external diameter, and there is an opening extending through said body from said first end to said second end.

BRIEF DESCRIPTION OF THE DRAWINGS

Other aspects of the invention will become apparent from the following description when read in conjunction with the accompanying drawings wherein.

DETAILED DESCRIPTION OF THE INVENTION

Figure 1:
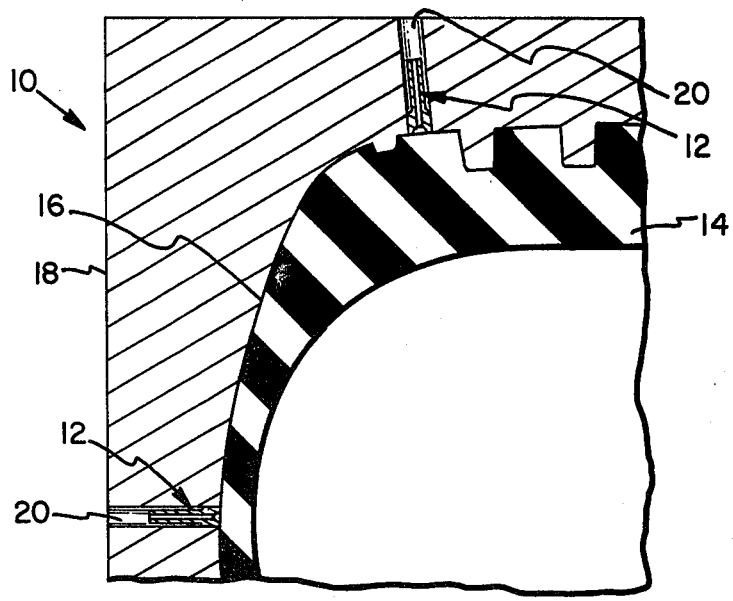
FIG. 1 is a fragmentary schematic view of a tire mold having vent plugs mounted therein.

Referring first to FIG. 1, there is shown a fragmentary schematic view of a tire mold 10 having vent plugs 12 manufactured in accordance with the present invention mounted therein. A mold of the type shown in FIG. 1 is suitable for forming elastomeric articles and the like. Such a mold may be comprised of a first half and a second half (not shown) which interface along a parting line. In the instance where a tire 14 of natural or synthetic rubber is formed in the mold, vulcanization and shaping of the tire are accomplished by inflating a curing bladder (not shown) inside of the tire to push it against the molding surface of the mold, and then circulating hot water, steam or gas through the bladder.

A mold has an inner molding surface 16 and an outer surface 18. The inner molding surface 16 defines a cavity in which an article, such as a tire, may be formed. The inner molding surface 16 communicates with the outer surface 18 by means of at least one bore 20. The bores act as a vent means to allow air to escape from between the surface of the article being molded and the inner molding surface of the mold. Each bore 20 has a vent plug 12 inserted therein which substantially blocks off the bore, but which has a small opening therethrough which acts as a vent, or in other words as a microvent.

Figure 2:
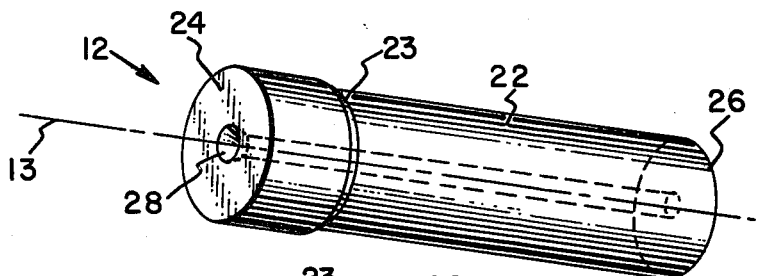
FIG. 2 is an enlarged perspective view of a vent plug manufactured in accordance with one embodiment of the invention.
Figure 3:
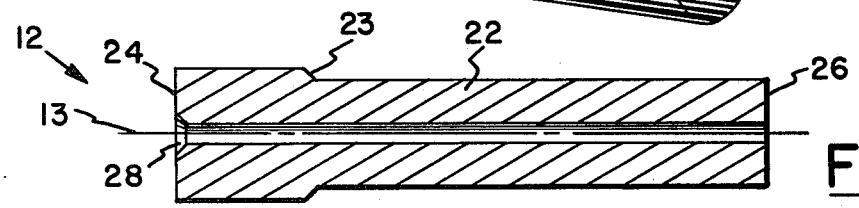
FIG. 3 is a sectional elevation of the embodiment shown in FIG. 2.

The function and structure of molds and vent plugs manufactured in accordance with the invention may be best described by referring to FIG. 2 and FIG. 3 of the drawings. FIG. 2 is an enlarged perspective view of a vent plug 12 manufactured in accordance with the embodiment shown in FIG. 1, and FIG. 3 is a sectional elevation of this same embodiment. The vent plug 12 comprises an elongated body 22 having an axis 13 and first and second axial ends 24,26. While it is preferable that the body have a generally circular cross-section along its entire length, it may have any cross-sectional shape that is complementary to the bore through the mold body. Of course, since most of the bores through molds are made with twist drills, most bores will have circular cross-sections.

The overall length of the body of the vent mold 12, measured parallel to its axis 13, is greater than any external diameter of the body, measured perpendicular to the axis. The body has at its first axial end 24 a first external diameter which is constant over a predetermined portion of the length of the body equal to not more than 50 percent of its overall length. Most preferably, the predetermined portion of the length of the body along which the first external diameter is constant is not more than 30 percent of the overall length of the body. The body along the remainder of its length has an external diameter that is less than the first external diameter. In the embodiment shown in FIGS. 1, 2 and 3, the remainder of the length of the body is cylindrical. The transition from the first external diameter to the smaller external diameter may be made with a 45-degree chamfer 33. The first external diameter is sufficiently greater than the diameter of a bore through the mold so that the vent plug may be press-fit into the bore. Preferably, the first axial end 24 of the vent plug 12 is at least substantially flush with the inner molding surface 16 of the mold. As used herein, a "press-fit" refers to a contact between two surfaces wherein a shaft or body is slightly larger than a bore so that that shaft or body must be forced into the bore. For example, if a bore through a mold is made using a ⅛ inch (3.175 mm) twist drill, the first external diameter of the vent plug body should be in the range of between about 3.23 mm. to 3.31 mm. to give a press-fit such that the vent plug may be conveniently removed if necessary. Removal of the vent plug is further facilitated by the fact that the press-fit relationship extends over only a predetermined portion of the overall length of the vent plug. For example, a vent plug having an overall length of about 14 mm. should have a first external diameter, which extends for about 3 mm. from the first axial end of the body. In the example of a vent plug having a first external diameter of between 3.23 mm. to 3.31 mm., the remainder of the length of the body should have a diameter of no more than 3 mm. An opening 28 extends through the elongated body 22 from the first axial end to the second axial end, and preferably is coaxial with the elongated body of the vent plug. Preferably, the opening 28 is slightly enlarged by a chamfer or bevel at the first axial end of the body so that the base of any projection that may result from elastomer flowing into the opening will be thickened and strengthened to reduce the likelihood of the projection breaking off of the molded article and plugging up the opening when the article is removed from the mold. It has been found that an opening having a diameter of about 0.60 mm. and a 45-degree bevel or chamfer at the first axial end of the body of the vent plug works very well to minimize undesirable projections and plugged-up vent plug openings.

Vent plugs may be manufactured of sintered stainless steel, compressed around a wire in a mold. The wire may then be disposed of so that the opening through the body of the vent plug is formed. Stainless steel, or any other non-corroding material, is preferred because corrosion could cause the opening to become plugged.

Figure 4:
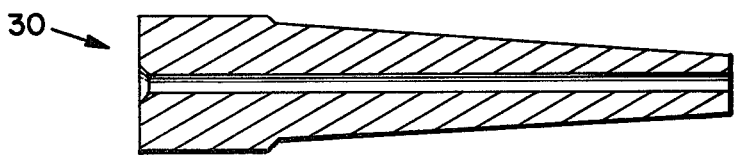
FIG. 4 is a sectional elevation of a second embodiment of the invention.
Figure 5:
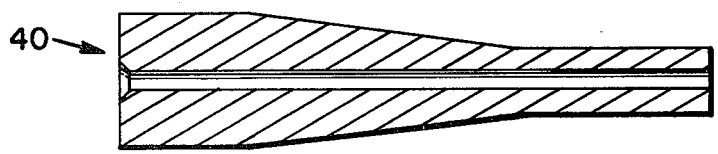
FIG. 5 is a sectional elevation of a third embodiment of the invention.

FIGS. 4 and 5 are sectional elevation views of other embodiments of vent plugs made in accordance with the invention. While these embodiments are substantially the same as that described in regard to FIGS. 2 and 3, the shape of the remainder of the body from the first external diameter to the second axial end is different. The vent plug 30 shown in FIG. 4 has a body that is tapered from the first external diameter to the second axial end. The vent plug 40 shown in FIG. 5 has a body which is tapered from the first external diameter along a first portion of the remainder of its length, and a second portion of the remainder of its length is cylindrical.

While certain representative details and embodiments have been shown for the purpose of illustrating the invention, it will be apparent to those skilled in the art that various changes and modifications may be made therein without departing from the spirit or scope of the invention.

What is claimed is:

1. A vent plug for a mold used in forming elastomeric articles and the like comprising an elongated body having an axis and first and second axial ends, the overall length of said body measured parallel to said axis being greater than any external diameter of said body measured perpendicular to said axis, said body having at said first axial end a first external diameter which is constant over a predetermined portion of the length of said body equal to not more than 50 percent of said overall length, said body along the remainder of its length having an external diameter that is less than said first external diameter, and an opening extending through said body from said first axial end to said second axial end.

2. A vent plug according to claim 1, wherein said body is tapered from said first external diameter to a second external diameter at said second axial end.

3. A vent plug according to claim 1, wherein said remainder of the length of said body is cylindrical.

4. A vent plug according to claim 1, wherein said body is tapered from said first external diameter to a second external diameter along a first portion of said remainder of its length, and a second portion of said remainder of its length is cylindrical.

5. A vent plug according to any of claims 1, 2, 3 or 4, wherein the predetermined portion of the length of said body along which said first external diameter is constant is not more than 30 percent of said overall length.

6. A vent plug according to any of claims 1, 2, 3, or 4, wherein said opening is beveled at said first end of said body.

7. A vent plug according to any of claims 1, 2, 3, or 4, wherein said opening is coaxial with said elongated body.

8. A vent plug according to claim 7, wherein said opening is beveled at said first axial end of said body.

9. A body for forming elastomeric articles and the like, said mold comprising an inner molding surface and an outer surface, said inner molding surface defining a cavity in which an article may be formed and communicating with said outer surface by means of a bore, said bore having a vent plug therein, said vent plug comprising: an elongated body having an axis and first and second axial ends, the overall length of said body measured parallel to said axis being greater than any external diameter of said body measured perpendicular to said axis, said body having at said first axial end a first external diameter which is constant over a predetermined portion of the length of said body equal to not more than 50 percent of said overall length, said first external diameter being sufficiently greater than the diameter of said bore so that said vent plug is press-fit into said bore, said body along the remainder of its length having an external diameter that is less than said first external diameter, and an opening extending through said body from said first axial end to said second axial end.

10. A mold according to claim 9, wherein the body of said vent plug is tapered from said first external diameter to a second external diameter at said second end.

11. A mold according to claim 9, wherein said remainder of the length of the body of said vent plug is cylindrical.

12. A mold according to claim 9, wherein the body of said vent plug is tapered from said first external diameter to a second external diameter along a predetermined portion of said remainder of its length, and the rest of said remainder of its length is cylindrical.

13. A mold according to any of claims 9, 10, 11, or 12, wherein the predetermined portion of the length of the body and said vent plug along which said first external diameter is constant is not more than 30 percent of said overall length.

14. A mold according to any of claims 9, 10, 11, or 12, wherein the opening through said vent plug is beveled at the first axial end of the body of said vent plug.

15. A mold according to any of claims 9, 10, 11, or 12, wherein the opening through said vent plug is coaxial with the elongated body of said vent plug.

16. A mold according to claim 15, wherein the opening through said vent plug is beveled at the first axial end of the body of said vent plug.

* * * * *

UNITED STATES PATENT AND TRADEMARK OFFICE
CERTIFICATE OF CORRECTION

PATENT NO. : 4,436,497
DATED : March 13, 1984
INVENTOR(S) : James M. Dahl, Bernard B. Jacobs, Joseph E. Lipovac, Ralph A. Meglen and Donald W. Ward It is certified that error appears in the above-identified patent and that said Letters Patent are hereby corrected as shown below:

In column 2, line 14, "external," should be -- external -- .
In column 3, line 31, "chamfer 33" should be -- chamfer 23 -- .
In column 4, line 64, "9. A body" should be -- 9. A mold -- .

Signed and Sealed this

Thirty-first Day of July 1984

[SEAL]

Attest:

GERALD J. MOSSINGHOFF

Attesting Officer  Commissioner of Patents and Trademarks